(12) United States Patent
Schmitt

(10) Patent No.: US 9,516,504 B2
(45) Date of Patent: Dec. 6, 2016

(54) INTELLIGENT ROLE BASED ACCESS CONTROL BASED ON TRUSTEE APPROVALS

(71) Applicant: Verizon Patent and Licensing Inc., Arlington, VA (US)

(72) Inventor: David A. Schmitt, Lutz, FL (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 264 days.

(21) Appl. No.: 14/281,099

(22) Filed: May 19, 2014

(65) Prior Publication Data

US 2015/0334119 A1 Nov. 19, 2015

(51) Int. Cl.
*H04W 12/08* (2009.01)
*H04L 29/06* (2006.01)
*G06F 21/62* (2013.01)

(52) U.S. Cl.
CPC .............. *H04W 12/08* (2013.01); *G06F 21/62* (2013.01); *H04L 63/104* (2013.01); *H04L 63/105* (2013.01); *G06F 2221/2141* (2013.01)

(58) Field of Classification Search
CPC ....... H04L 63/10; H04L 63/104; H04W 12/08; G06F 21/62; G06F 2221/2141
See application file for complete search history.

(56) References Cited

U.S. PATENT DOCUMENTS

| 8,813,225 | B1 * | 8/2014 | Fuller | H04L 63/10 726/23 |
| 8,856,879 | B2 * | 10/2014 | Schechter | G06F 21/31 235/375 |
| 2004/0162906 | A1 * | 8/2004 | Griffin | G06F 21/6218 709/229 |
| 2008/0313716 | A1 * | 12/2008 | Park | H04L 63/104 726/4 |

(Continued)

FOREIGN PATENT DOCUMENTS

FR 3014583 A1 * 6/2015 ............. H04L 63/08

OTHER PUBLICATIONS

Bo Tang, Qi Li, Ravi Sandhu. "A Multi-Tenant RBAC Model for Collaborative Cloud Services" 2013 Eleventh Annual Conference on Privacy, Security, and Trust (pp. 229-238).*

(Continued)

*Primary Examiner* — Joseph P Hirl
*Assistant Examiner* — Thomas Gyorfi

(57) ABSTRACT

A device is configured to receive a role request to generate a role used for access control. The device may generate the role based on the role request. The device may associate a group of accounts, a group of resources, and a group of operations with the role. The device may receive an account trustee approval decision for the role from an account trustee. The account trustee may be responsible for managing at least one account included in the group of accounts. The device may receive a resource trustee approval decision for the role from a resource trustee. The resource trustee may (Continued)

be responsible for managing at least one resource included in the group of resources. The device may selectively cause an account to be permitted to perform an operation on a resource based on the account trustee decision and the resource trustee decision.

20 Claims, 10 Drawing Sheets

(56) References Cited

U.S. PATENT DOCUMENTS

2013/0086658 A1* 4/2013 Kottahachchi .......... G06F 21/45
726/6
2014/0343989 A1* 11/2014 Martini .......... G06Q 10/063118
705/7.17

OTHER PUBLICATIONS

Xiangning Zhou, Zhaolong Wang. "An Access Control Model of Workflow System Integrating RBAC and TBAC" Seventh IFIP International Conference on e-Business, e-Services, and e-Society (Oct. 10-12, 2007) (6 pages).*

Stuart Schechter et al. "It's Not What You Know, But Who You Know: A social approach to last-resort authentication" © 2009 ACM (10 pages) https://www.microsoft.com/en-us/research/wp-content/uploads/2016/02/paper1459-schechter.pdf.*

Wikipedia, "Role-based access control", http://en.wikipedia.org/wiki/Role-based_access_control, May 6, 2014, 7 pages.

David F. Ferraiolo et al., "Role-Based Access Control Second Edition", Artech House, Inc., 2007, 405 pages.

Hitachi ID Systems, Inc., "Beyond Roles: A Practical Approach to Enterprise User Provisioning", http://hitachi-id.com/identity-manager/docs/beyond-roles.html, Jul. 13, 2006, 19 pages.

Richard T. Snodgrass, "Developing Time-Oriented Database Applications in SQL", Morgan Kaufmann Publishers, Inc., Jul. 1999, 528 pages.

L. Howard, "An Approach for Using LDAP as a Network Information Service", http://tools.ietf.org/html/rfc2307, Mar. 1998, 21 pages.

Todd C. Miller, "Sudoers LDAP Manual", http://www.sudo.ws/sudo/sudoers.ldap.man.html, Nov. 11, 2008, 12 pages.

G. Good, "The LDAP Data Interchange Format (LDIF)—Technical Specification", http://www.ietf.org/rfc/rfc2849.txt, Jun. 2000, 14 pages.

PADL Software Pty Ltd, "pam_ldap" http://www.padl.com/OSS/pam_ldap.html, Feb. 1, 2001, 2 pages.

* cited by examiner

INTELLIGENT ROLE BASED ACCESS CONTROL BASED ON TRUSTEE APPROVALS

BACKGROUND

Access control models may be used to ensure that information is modified or accessed only in authorized ways and by authorized people. A basic unit of access control is known as an access control triple (AC-triple). An AC-triple is a combination of information identifying a subject (e.g., a user's account), an object (e.g., a resource or computer system), and an operation (e.g., an action to be performed). Accordingly, an AC-triple may permit a subject to perform an operation on an object.

Role based access control (RBAC) allows users to be assigned to roles based on the user's competencies, authorities, and responsibilities. System administrators may specify access requirements to objects at a same level of abstraction as typical business processes in an enterprise instead of specifying permission on a per AC-triple basis.

DETAILED DESCRIPTION OF PREFERRED EMBODIMENTS

The following detailed description of example implementations refers to the accompanying drawings. The same reference numbers in different drawings may identify the same or similar elements.

Specifying permissions at an AC-triple level may result in a large number of AC-triples having to be managed. For example, permitting 100 accounts to perform 100 operations on 100 objects may result in a million AC-triples having to be managed. Moreover, there is no direct link between a business function (e.g., a reason why the AC-triple was created in the first place) and the AC-triple, which makes reauthorizing each AC-triple a difficult and lengthy process for a system administrator.

RBAC attempts to address some of these issues by facilitating authorization management and review. However, in the RBAC model, assigning new accounts, new operations, or new resources to a role immediately grants permissions to all assigned users without any separate approval step. Such an approach requires that all trustees that are responsible for managing specific accounts and/or resources agree in advance that changes to permissions may be made by the system administrator. Essentially, trustees must give authority to the system administrator to create roles and add accounts and/or systems to the roles in any combination. Requiring such preapprovals may make it difficult for a role to be created and/or for a trustee to properly manage an account and/or a resource.

Implementations described herein provide an intelligent RBAC (IRBAC) model that separates role maintenance into a two phase approval process. Accordingly, a role maintainer may create a role without needing special privileges, and role details may be added to the role without unapproved privilege escalation. The role details added to the role may not result in a new privilege until the two phase approval process is complete. Moreover, access control lists (ACLs) may be updated using the IRBAC model without having to generate AC-triples for all possible permissions.

Figure 1:
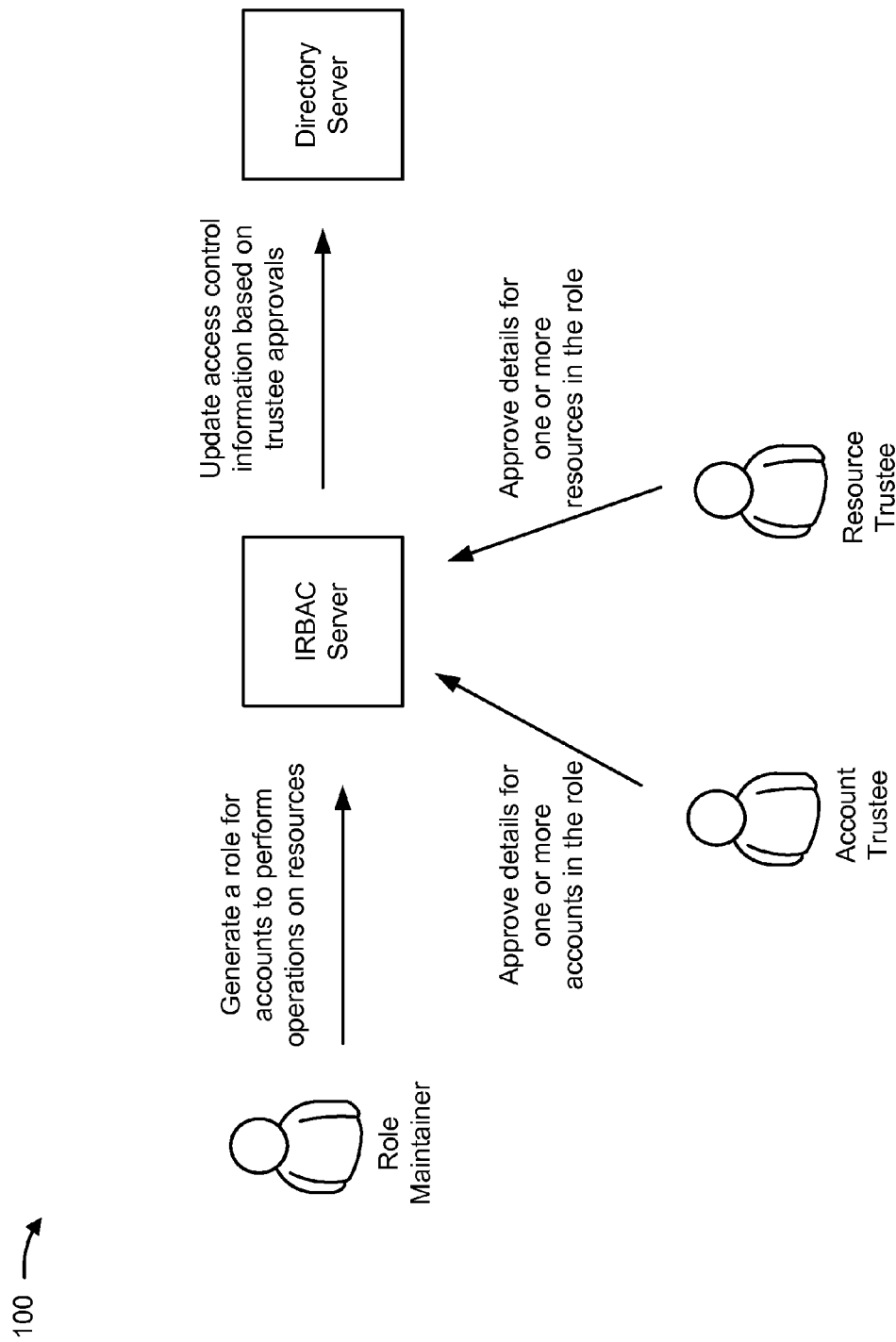
FIG. 1 is a diagram of an overview of an example implementation described herein.

FIG. 1 is a diagram of an overview of an example implementation 100 described herein. In example implementation 100, assume a role maintainer sends a request to an IRBAC server to generate a role. The role maintainer may specify a description of the role and associate the role with a business function. The role maintainer may specify one or more accounts to be associated with the role, one or more operations to be associated with the role, and one or more resources to be associated with the role. In other words, the role maintainer may identify accounts that should be allowed to perform certain operations for certain resources. For example, the role may allow a user (e.g., associated with an account) to search (e.g., an operation) certain databases (e.g., resources). The IRBAC server may generate the role based on the request by storing an entry in a role data structure for the role.

Each account associated with the role may be managed by an account trustee. For example, an employee's account may be managed by the employee's supervisor (e.g., an account trustee). In some implementations, an account trustee may manage several accounts, but each account may only be managed by a single account trustee. The IRBAC server may send a request to an account trustee to approve role details for accounts, managed by the account trustee, that are associated with the role. The account trustee may approve or deny each individual account, managed by the account trustee, and approve or deny each operation and resource associated with the role. The account trustee's decision regarding the operations and/or resources may apply to all accounts managed by the account trustee. Accordingly, all accounts approved by the account trustee will be approved for the same operations and resources associated with the role. The account trustee may send approval information indicating the decisions to the IRBAC server.

Each resource associated with the role may be managed by a resource trustee. In some implementations, a resource trustee may manage several resources, but each resource may only be managed by a single resource trustee. The IRBAC server may send a request to a resource trustee to approve resources, managed by the resource trustee, that are associated with the role. The resource trustee may approve or deny each individual resource, managed by the resource trustee, and approve or deny each operation and account associated with the role. The resource trustee's decision regarding the operations and/or accounts applies to all resources managed by the resource trustee. Accordingly, all resources approved by the resources trustee will be approved for the same operations and accounts associated with the role. The resource trustee may send approval information indicating the decisions to the IRBAC server.

The IRBAC server may receive and store the approval information from the account trustee and the resource trustee. A permission (e.g., a permission for an account to perform an operation on a resource) may require that both the account trustee and the resource trustee approved that the account be able to perform the operation on the resource. The IRBAC server may determine changed permissions between two points in time and update access control information stored in a directory server and/or a directory service (e.g., a software library that may be parsed for access control configurations). The IRBAC server may determine changed permissions based on changes in the account trustee approvals and the resource trustee approvals without having to generate AC-triples for all combinations of accounts, resources, and operations.

In this way, role based access control may be separated into a two phase approval process. Accordingly, account trustees and resource trustees may retain control over respective accounts and resources while still employing a role based access control model.

Figure 2:
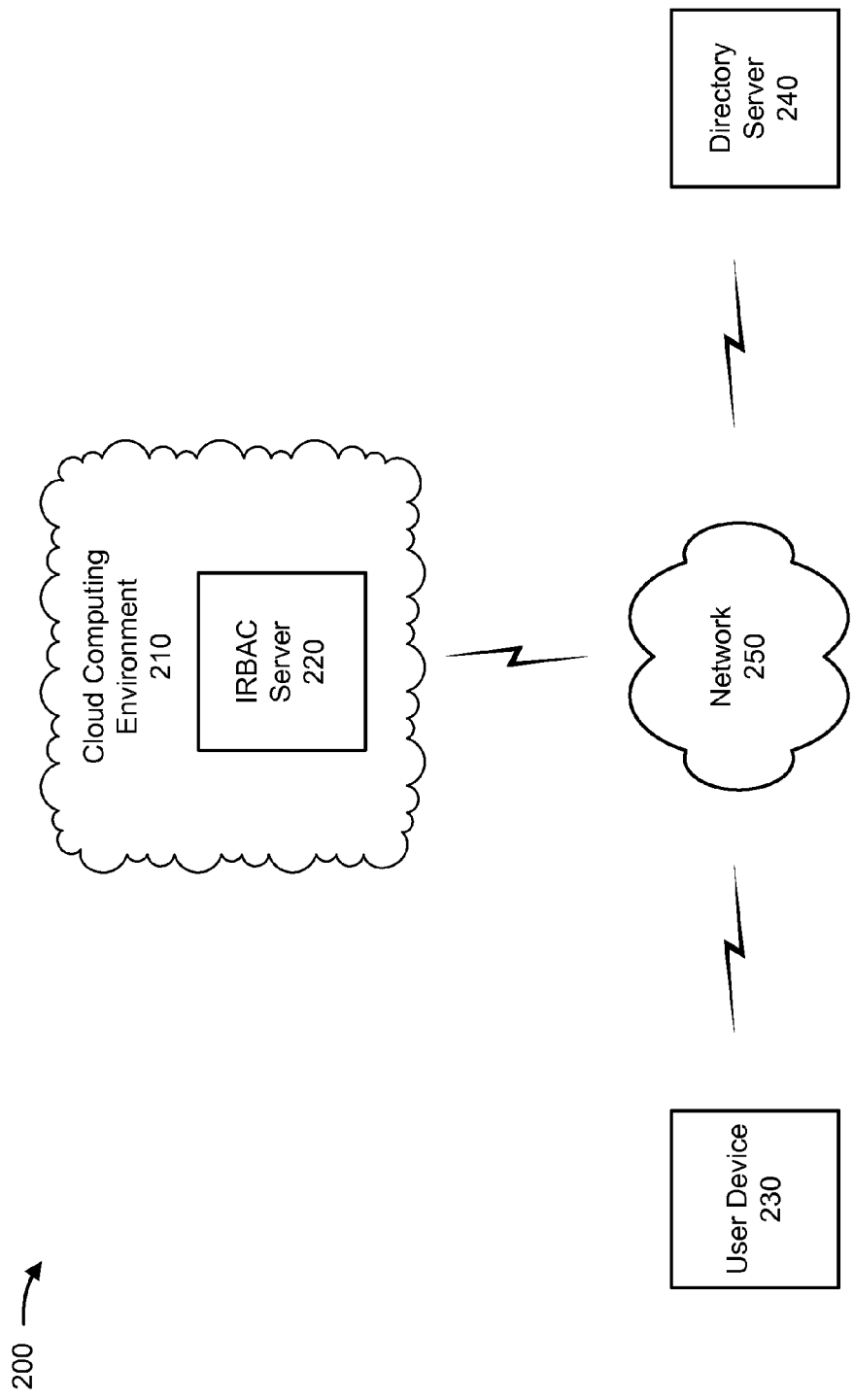
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a cloud computing environment 210, an IRBAC server 220, a user device 230, a directory server 240, and/or a network 250. Devices of environment 200 may interconnect via wired connections, wireless connections, or a combination of wired and wireless connections.

Cloud computing environment 210 may include an environment that delivers computing as a service, whereby shared resources, services, etc. may be provided to user device 230 and/or directory server 240. Cloud computing environment 210 may provide computation, software, data access, storage, and/or another service that does not require end-user knowledge of a physical location and configuration of a system and/or a device that delivers the service. As shown, cloud computing environment 210 may include IRBAC server 220.

IRBAC server 220 may include one or more devices capable of storing, processing, and/or routing information. In some implementations, IRBAC server 220 may include a communication interface that allows IRBAC server 220 to receive information from and/or transmit information to other devices in environment 200. IRBAC server 220 may manage a role data structure including approvals for role details from account trustees and resource trustees.

User device 230 may include a device capable of receiving, processing, and providing information. For example, user device 230 may include a mobile phone (e.g., a smart phone, a radiotelephone, etc.), a computing device (e.g., a laptop computer, a tablet computer, a handheld computer, a gaming device, etc.), or a similar device. In some implementations, user device 230 may include a communication interface that allows user device 230 to receive information from and/or transmit information to another device in environment 200. In some implementations, a respective user device 230 may be associated with a role maintainer, an account trustee, and a resource trustee.

Directory server 240 may include one or more devices capable of storing, processing, and/or routing information. In some implementations, directory server 240 may include a communication interface that allows directory server 240 to receive information from and/or transmit information to other devices in environment 200. Directory server 240 may store access control information (e.g., an access control list (ACL)) used to authenticate accounts to perform particular operations on particular resources. In some implementations, directory server 240 may be a centralized server (e.g., a lightweight directory access protocol (LDAP) server, an active directory server, etc.) that security domains access to authenticate access of users or accounts in respective security domains.

Network 250 may include one or more wired and/or wireless networks. For example, network 250 may include a cellular network, a public land mobile network (PLMN), a second generation (2G) network, a third generation (3G) network, a fourth generation (4G) network, a fifth generation (5G) network, a long term evolution (LTE) network, and/or a similar type of network. Additionally, or alternatively, network 250 may include a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a satellite network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
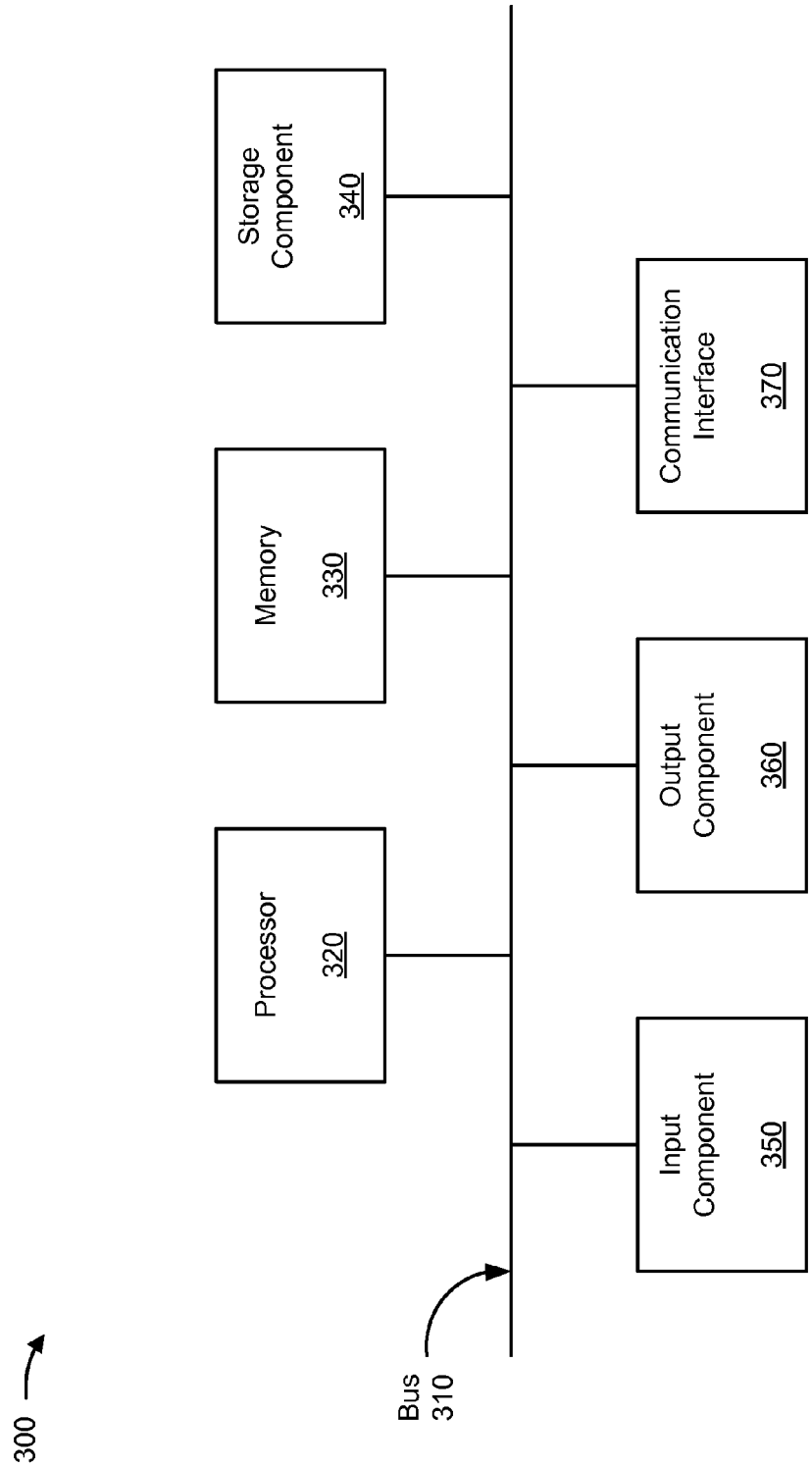
FIG. 3 is a diagram of example components of one or more devices of FIG. 2.

FIG. 3 is a diagram of example components of a device 300. Device 300 may correspond to IRBAC server 220, user device 230, and/or directory server 240. In some implementations, IRBAC server 220, user device 230, and/or directory server 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
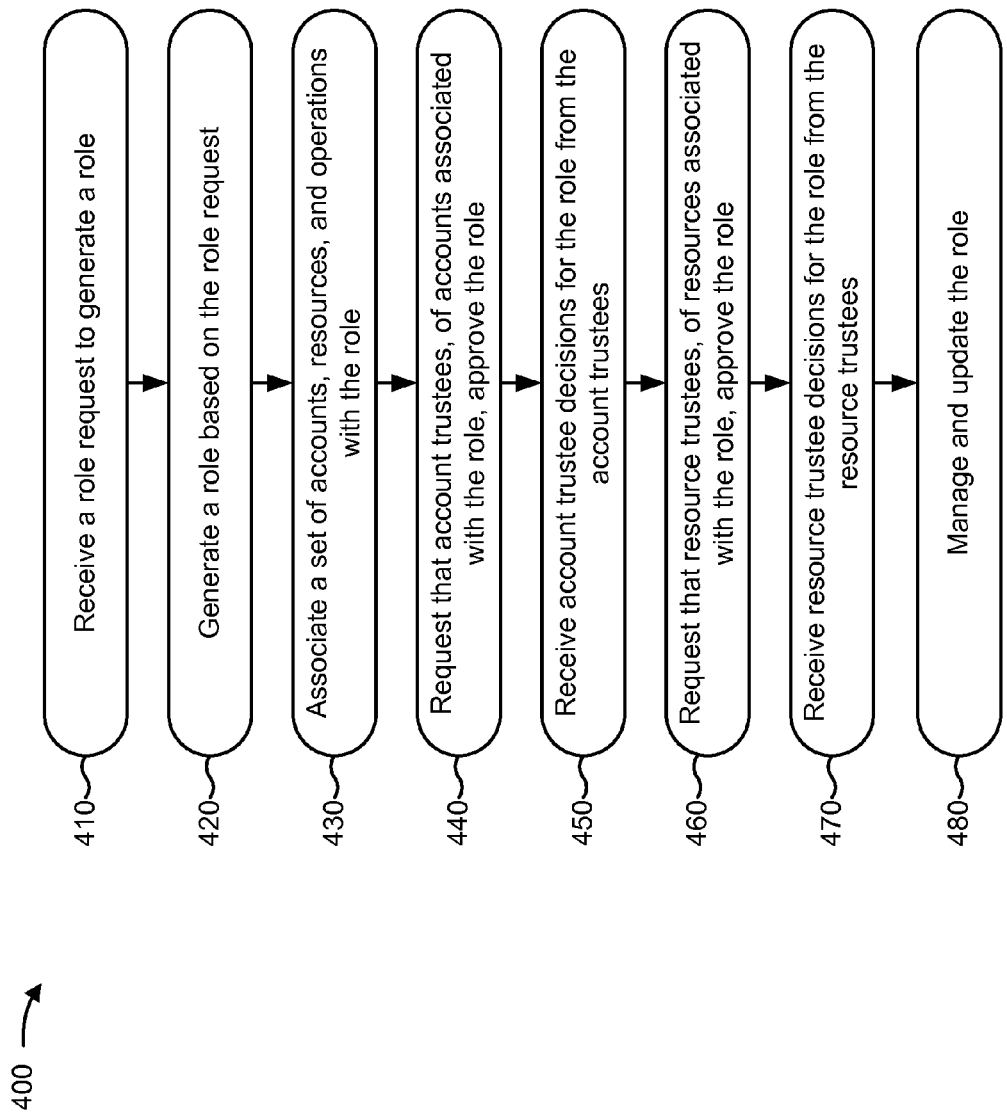
FIG. 4 is a flow chart of an example process for generating a role and approving accounts, resources, and operations for the role.

FIG. 4 is a flow chart of an example process 400 for generating a role and approving accounts, resources, and operations for the role. In some implementations, one or more process blocks of FIG. 4 may be performed by cloud computing environment 210 and/or IRBAC server 220. In some implementations, one or more process blocks of FIG. 4 may be performed by another device or a group of devices separate from or including cloud computing environment 210 and/or IRBAC server 220, such as user device 230 and/or directory server 240.

As shown in FIG. 4, process 400 may include receiving a role request to generate a role (block 410). For example, IRBAC server 220 may receive the role request from user device 230.

In some implementations, IRBAC server 220 may operate an IRBAC service (e.g., a website, an application, a web application, a resource management service, or the like) that allows users to generate, maintain, update, and authorize roles. A role may be a business function that defines an authority level for performing an operation (e.g., an action to be performed) on an object (e.g., a computer system entity on which an operation may be performed). In other words, a subject (e.g., a user) associated with and approved for the role may be authorized to perform the operation on the object.

A role maintainer may log into the IRBAC service operated by IRBAC server 220. The role maintainer may use user device 230 to send a role request, which requests a role be created, to IRBAC server 220 via the IRBAC service. IRBAC server 220 may receive the role request and provide user device 230 with an interface for inputting information about the role. IRBAC server 220 may receive the interface and present the interface to the role maintainer. The role maintainer may use the interface to input role configuration information into user device 230. The role configuration information may indicate a name of the role, a description of the role (e.g., a description of the business function), a reason why a subject (e.g., a user) may need access to the role, etc. User device 230 may receive the role configuration information and send the role configuration information to IRBAC server 220.

As further shown in FIG. 4, process 400 may include generating a role based on the role request (block 420). For example, IRBAC server 220 may generate the role.

IRBAC server 220 may receive the role configuration information sent by user device 230 and generate a role based on the role request. IRBAC server 220 may generate the role by adding an entry to a role data structure. The role data structure may be a data structure that stores information on multiple roles. The role data structure may be stored in a memory included in or accessible by IRBAC server 220. The entry added to the role data structure may include the role configuration information. Additionally, or alternatively, the entry may indicate if the role is active or inactive. Subjects associated with an active role may be able to perform operations on resources associated with the role. On the other hand, subjects associated with an inactive role may not be able to perform operations on resources associated with the role. In some implementations, the role may be set as active by default.

As further shown in FIG. 4, process 400 may include associating a set of accounts, resources, and operations with the role (block 430). For example, IRBAC server 220 may associate an account, a resource, and an operation with the role.

The role maintainer may use the interface to identify an account(s), a resource(s), and an operation(s) that the role maintainer intends to be associated with the role.

For example, the role maintainer may further use the interface to input account information, which identifies one or more accounts to be associated with the role, into user device 230. An account may include a user account assigned to a user (e.g., an employee of a company, a contractor, a customer of a company, etc.). Additionally, or alternatively, an account may include a functional account used to run application services. A functional account may not be associated with a user. User device 230 may send the account information to IRBAC server 220. IRBAC server 220 may receive and store the account information identifying the account(s) to be associated with the role.

Likewise, the role maintainer may further use the interface to input resource information, which identifies one or more resources to be associated with the role, into user device 230. A resource may be a coarse-grained object within a security domain (e.g., a data structure, a computer system, a computer system peripheral, a computer resource component, a particular region within an application, etc.). For example, in a Portable Operating System Interface (POSIX) security domain, resources may include POSIX systems identified by a fully qualified domain name (FQDN). User device 230 may send the resource information to IRBAC server 220. IRBAC server 220 may receive and store the resource information identifying the resource(s) to be associated with the role.

Similarly, the role maintainer may further use the interface to input operation information, which identifies one or more operations to be associated with the role, into user device 230. An operation may be coarse-grained and provide access to specific data and/or actions depending on the security domain and resource type associated with the operation. For example, the POSIX security domain may include three operation types: login (e.g., the ability to log-in, a password may be required); sudo (e.g., each operation describes a specific command and/or run-as-user that is permitted); and secondary POSIX group membership (e.g., each operation specifies a functional group). User device 230 may send the operation information to IRBAC server 220. IRBAC server 220 may receive and store the operation information identifying the operation(s) to be associated with the role.

Within a security domain, only certain combinations of accounts, operations, and resources will produce valid combinations. For example, within the POSIX security domain, the login operation may not apply to a functional account on a POSIX system. Accordingly, the interface provided by IRBAC server 220 may only allow valid combinations to be associated with a role.

While the role maintainer may have caused an account, a resource, and an operation to be associated with the role, the account may not be permitted to perform the operation on the resource until the account, the resource, and the operation have been approved by the proper trustees. In other words, while the role maintainer may intend for the account, the resource, and the operation to be linked with the role, proper approval may still be needed.

In some implementations, the role details associated with account (e.g., the accounts, the resources, and/or the operations) may be associated with a transaction time and/or a valid time. The transaction time may indicate the time the role details were associated with the role and the role maintainer may be required to reconfirm the role details a certain amount of time after the transaction time. If the role maintainer does not reconfirm the role details, privileges resulting from the role may be canceled. Additionally, or alternatively, the role maintainer may identify a valid period that indicates a time period, a start time, and/or end time for which the role and/or role details are valid. In other words, the role maintainer may cancel privileges resulting from the role (e.g. after trustees have made the appropriate approvals) without involving the trustees.

As further shown in FIG. 4, process 400 may include requesting account trustees, of accounts associated with the role, approve the role (block 440). For example, IRBAC server 220 may request an account trustee approve the role.

An account trustee may be a person or a group of people responsible for managing an account. For example, for a user account, an account trustee may be a supervisor (or other responsible party) of a user associated with the user account. For a functional account, an account trustee may be designated to manage the functional account.

IRBAC server 220 may access an account data structure that stores information associating accounts with an account trustee that manages an account. An account trustee may manage multiple accounts, but each account may only be managed by one account trustee. IRBAC server 220 may search the account data structure using the account associated with the role and identify the account trustee that manages the account.

IRBAC server 220 may send a request to the account trustee to approve the role. For example, IRBAC server 220 may send a notification to the account trustee that the account trustee's approval is needed and request that the account trustee log into the IRBAC service. The account trustee may receive the notification and use user device 230 to log into the IRBAC service.

IRBAC server 220 may provide information to the account trustee, via user device 230, about the role that needs to be approved. For example, IRBAC server 220 may provide the role configuration information that indicates a name of the role, a description of the role (e.g., a description of the business function), and/or a reason why a subject (e.g., a user) may need access to the role. Accordingly, the account trustee may be given some context as to why an account should be approved for the role.

In some implementations, IRBAC server 220 may provide information identifying each account associated with the role that is managed by the account trustee. However, IRBAC server 220 may not provide information identifying accounts managed by other account trustees. The account trustee may receive the information, via user device 230, and input an account trustee (AT) account decision to approve or deny an account for the role. For example, if multiple accounts managed by the account trustee have been associated with the role (e.g., due to the role maintainer requesting the accounts be associated with the role), the account trustee may make an individual AT account decision to approve or deny each account for the role. In other words, the account trustee may make multiple AT account decisions for a single role.

In some implementations, IRBAC server 220 may provide information identifying the resource(s) associated with the role to the account trustee. The account trustee may receive the information, via user device 230, and input an AT resource decision to approve or deny each resource for the role. The AT resource decision may apply to all accounts associated with the role that are managed by the account trustee, and may only apply to the accounts managed by the account trustee. In other words, the account trustee may generically approve or deny a resource for all accounts managed by the account trustee, and may not approve or deny a resource for each individual account.

In some implementations, IRBAC server 220 may provide information identifying the operation(s) associated with the role to the account trustee. The account trustee may receive the information, via user device 230, and input an AT operation decision to approve or deny each operation for the role. The AT operation decision may apply to all accounts associated with the role that are managed by the account trustee, and may only apply to the accounts managed by the account trustee. In other words, the account trustee may generically approve or deny an operation for all accounts managed by the account trustee, and may not approve or deny an operation for each individual account.

User device 230 may send an account trustee decision to IRBAC server 220. The account trustee decision may indicate the AT account decision(s), the AT resource decision(s), and/or the AT operation decision(s) made by the account trustee. Furthermore, the account trustee decision may indicate an AT transaction time that the account trustee decision was made. Additionally, the account trustee decision may identify an AT valid period that indicates a time period, a start time, and/or end time for which the account trustee decision is valid. In some implementations, the AT valid time may be at an AT account decision level, an AT resource decision level, and/or an AT operation decision level.

In some implementations, IRBAC server 220 may provide information to multiple account trustees, via respective user devices 230, about the role that needs to be approved. For example, accounts having different account trustees may be associated with the role. Each account trustee may be requested to approve the role for respective accounts managed by the account trustee. Accordingly, user devices 230 may send multiple account trustee decisions from respective account trustees.

As further shown in FIG. 4, process 400 may include receiving account trustee decisions for the role from the account trustees (block 450). For example, IRBAC server 220 may receive an account trustee decision from each of the account trustees for respective accounts managed by the account trustees.

IRBAC server 220 may store the account trustee decisions in the role data structure. For example, each account associated with the role in the role data structure may be associated with a single AT account decision (e.g., an approval or denial) from the account trustee that manages the account. On the other hand, each resource associated with the role in the role data structure may be associated with multiple AT resource decisions (e.g., one from each account trustee that applies to accounts managed by the account trustee). Likewise, each operation associated with the role in the role data structure may be associated with multiple AT operation decisions (e.g., one from each account trustee that applies to accounts managed by the account trustee).

In some implementations, IRBAC server 220 may store information identifying the AT transaction time and the AT valid time in the role data structure for the role.

As further shown in FIG. 4, process 400 may include requesting resource trustees, of resources associated with the role, approve the role (block 460). For example, IRBAC server 220 may request a resource trustee approve the role.

A resource trustee may be a person (or group of people) responsible for managing a resource. For example, in the POSIX security domain, each system (e.g., a resource) is assigned to a trustee group (e.g., the resource trustee) and members of that group perform approvals.

IRBAC server 220 may access a resource data structure that stores information associating resources with a role trustee that manages a resource. A resource trustee may manage multiple resources, but each resource may only be managed by one resource trustee. IRBAC server 220 may search the resource data structure using information identifying the resource associated with the role and identify the resource trustee that manages the resource.

IRBAC server 220 may send a request to the resource trustee to approve the role. For example, IRBAC server 220 may send a notification to the resource trustee that the resource trustee's approval is needed and request that the resource trustee log into the IRBAC service. The resource trustee may receive the notification and use user device 230 to log into the IRBAC service.

In some implementations, IRBAC server 220 may wait until account trustee decisions (e.g., approvals) for the role have been received before requesting the resource trustee approve the role. In this way, resource trustees do not have to be bothered if no accounts are approved for the role. On the other hand, IRBAC server 220 may wait until resource trustee decisions (e.g., approvals) for the role have been received before requesting the account trustee approve the role. In this way, account trustees do not have to be bothered if no resources are approved for the role.

IRBAC server 220 may provide information to the resource trustee, via user device 230, about the role that needs to be approved. For example, IRBAC server 220 may provide the role configuration information that indicates a name of the role, a description of the role (e.g., a description of the business function), and/or a reason why a subject (e.g., a user) may need access to the role. Accordingly, the resource trustee may be given some context as to why a resource should be approved for the role.

In some implementations, IRBAC server 220 may provide information identifying each resource associated with the role that is managed by the resource trustee. However, IRBAC server 220 may not provide information identifying resources managed by other resource trustees. The resource trustee may receive the information, via user device 230, and input a resource trustee (RT) resource decision to approve or deny a resource for the role. For example, if multiple resources managed by the resource trustee have been associated with the role (e.g., due to the role maintainer requesting the resources be associated with the role), the account trustee may make an individual RT resource decision to approve or deny each resource for the role. In other words, the resource trustee may make multiple RT resource decisions for a single role.

In some implementations, IRBAC server 220 may provide information identifying the accounts(s) associated with the role to the resource trustee. The resource trustee may receive the information, via user device 230, and input a RT account decision to approve or deny each account for the role. The RT account decision may apply to all resources associated with the role that are managed by the resource trustee, and may only apply to the resources managed by the resource trustee. In other words, the resource trustee may generically approve or deny an account for all resources managed by the resource trustee, and may not approve or deny an account for each individual resource.

In some implementations, IRBAC server 220 may provide information identifying the operation(s) associated with the role to the resource trustee. The resource trustee may receive the information, via user device 230, and input a RT operation decision to approve or deny each operation for the role. The RT operation decision may apply to all resources associated with the role that are managed by the resource trustee, and may only apply to the resources managed by the resource trustee. In other words, the resource trustee may generically approve or deny an operation for all resources managed by the resource trustee, and may not approve or deny an operation for each individual resource.

User device 230 may send a resource trustee decision to IRBAC server 220. The resource trustee decision may indicate the RT account decision(s), the RT resource decision(s), and/or the RT operation decision(s) made by the resource trustee. Furthermore, the resource trustee decision may indicate a RT transaction time that the resource trustee decision was made. Additionally, the resource trustee decision may identify a RT valid period that indicates a time period, a start time, and/or end time for which the resource trustee decision is valid. In some implementations, the RT valid time may be at a RT account decision level, a RT resource decision level, and/or a RT operation decision level.

In some implementations, IRBAC server 220 may provide information to multiple resource trustees, via respective user devices 230, about the role that needs to be approved. For example, resources having different resources trustees may be associated with the role. Each resource trustee may be requested to approve the role for respective resources managed by the resource trustee. Accordingly, user devices 230 may send multiple resource trustee decisions from respective resource trustees.

As further shown in FIG. 4, process 400 may include receiving the resource trustee decisions for the role from the resource trustees (block 470). For example, IRBAC server 220 may receive a resource trustee decision from each of the resource trustees for respective resources managed by the resource trustees.

IRBAC server 220 may store the resource trustee decisions in the role data structure. For example, each resource associated with the role in the role data structure may be associated with a single RT resource decision (e.g., an approval or denial) from the resource trustee that manages the resource. On the other hand, each account associated with the role in the role data structure may be associated with multiple RT account decisions (e.g., one from each resource trustee that applies to resources managed by the resource trustee). Likewise, each operation associated with the role in the role data structure may be associated with multiple RT operation decisions (e.g., one from each resource trustee that applies to resources managed by the resource trustee).

In some implementations, IRBAC server 220 may store information identifying the RT transaction time and the RT valid time in the role data structure for the role.

As further shown in FIG. 4, process 400 may include managing and updating the role (block 480). For example, IRBAC server 220 may manage and update the role.

In some implementations, a role maintainer may cause IRBAC server 220 to change the role. For example, the role maintainer may request that a new account, a new resource, and/or a new operation be added to the role, and IRBAC server 220 may associate the new account, the new resource, and/or the new operation with the role.

If a new account is added, IRBAC server 220 may send a request to the account trustee that manages the new account to approve the account for the role. The account trustee may not be required to approve each resource nor each operation for the role again as these decisions have already been made for the role at blocks 440 and 450. Likewise, IRBAC server 220 may send a request to each resource trustee, which manages a resource for the role, to approve the new account for the role. The resource trustee may not be required to approve each resource for the new account as these decisions have already been made for the role at blocks 460 and 470. Accordingly, each resource trustee only has to make one decision, instead of one for each resource managed by the resource trustee, to permit a new account access to multiple resources.

If a new resource is added, IRBAC server 220 may send a request to the resource trustee that manages the new resource to approve the resource for the role. The resource trustee may not be required to approve each account nor each operation for the role again as these decisions have already been made for the role at blocks 460 and 470. IRBAC server 220 may further send a request to each account trustee, which manages an account for the role, to approve the resource for the role. Each account trustee may not be required to approve each account for the new resource as these decisions have already been made for the role at blocks 440 and 450. Accordingly, each account trustee only has to make one decision, instead of one for each account, to approve the new resource be used by multiple accounts.

If a new operation is added, IRBAC server 220 may send a request to each resource trustee and each account trustee to approve the operation for the role. Each resource trustee may only have to make one decision to approve or deny the operation for the role, instead of approving or denying the operation for each resource managed by the resource trustee. Likewise, each account trustee may only have to make one decision to approve or deny the operation for the role, instead of approving or denying the operation for each account managed by the account trustee.

The resource trustee(s) and/or the account trustee(s) may send the decisions for the new account(s), new resource(s), and/or new operation(s) for the role to IRBAC server 220. IRBAC server 220 may receive the decisions and update the role data structure accordingly.

In some implementations, IRBAC server 220 may enforce an auditing review. For example, an account trustee's approval and/or a resource trustee's approval may expire after an effective period (e.g., a particular amount of time for which the approval is valid). Each account trustee and/or resource trustee may customize the effective period or how often auditing reviews are to be performed. In some implementations, a maximum effective period may be set (e.g., by a company operating IRBAC server 220) at which an auditing review may be required. In some implementations, only trustee approvals may need to be reviewed and trustee denials may not need to be reviewed.

IRBAC server 220 may determine when an auditing review is needed based on an AT transaction time (e.g., a time an approval was made by an account trustee), a RT transaction time (e.g., a time an approval was made by a resource trustee), and/or an effective period (e.g., a particular number of hours, days, months, years, from a most recent transaction time). At an auditing review time, IRBAC server 220 may notify the account trustee and/or the resource trustee that a role needs to be reapproved. If the account trustee and/or the resource trustee fail to reapprove the role, IRBAC server 220 may automatically cancel any approvals after the effective period passes.

In some implementations, a role maintainer and/or an account owner (e.g., a user of a user account) may appeal a denial from an account trustee and/or a resource trustee. The role maintainer and/or the account owner may initiate the appeal using the IRBAC service via a user device 230. When an appeal is initiated, IRBAC server 220 may send another request to the account trustee and/or resource trustee that denied the role detail (e.g., the account, the resource, and/or the operation for the role) based on the appeal. IRBAC server 220 may cause the request to be segregated from any other pending requests for approval so it is clear to the account trustee and/or resource trustee that the request was previously denied.

In some implementations, when a user (e.g., an employee) transfers to a new supervisor (e.g., a new account trustee) and/or a resource is assigned to a new resource trustee, IRBAC server 220 may automatically send a request to the new account trustee and/or the new resource trustee to reapprove all roles which included those accounts or resources. To avoid interruptions of service, IRBAC server 220 may allow for a grace period during which approvals by the previous trustee are retained for a particular amount of time. Each trustee may customize the grace period (or eliminate the grace period). If a new trustee does not renew the approvals by the end of the grace period, then the IRBAC server 220 may automatically cancel the approvals.

Furthermore, storing approvals of role details at the account trustee and resource trustee levels results in fewer approval records for a role being stored than if the approvals were stored at the AC-triples levels.

For example, to store separate approval records for each AC-triple may require: N=a*o*r; where "N" is the number of approval records, "a" is the number of accounts associated with the role, "o" is the number of operations associated with the role, and "r" is the number of resources associated with the role. On the other hand, to store approval records at account trustee and resource trustee levels may only require: N=A(o+r+1)+R(a+o+1); where "A" is the number of distinct account trustees for accounts associated with the role, and where "R" is the number of distinct resource trustees for resources associated with the role.

Assume a role is associated with 30 accounts, 10 operations, and 30 resources. If approval records were stored at the AC-triple level, then 9,000 AC-triples would have to be stored for the role. Now assume a worst case scenario for the role and that there are distinct account trustees and resource trustees for each account and resource (i.e., there are 30 distinct account trustees for the 30 accounts, and 30 distinct resource trustees for the 30 resources). Assuming the worst case scenario, only 2,430 approval records would need to be stored to give the same logical level of approval as the 9,000 AC-triples. Now assume a best case scenario for the role and that there is one account trustee that manages all the accounts in the role and one resource trustee that manages all the resources in the role (i.e., there is one distinct account trustee for the 30 accounts, and one distinct resource trustee for the 30 resources). Assuming the best case scenario, only 140 approval records would need to be stored to give the same logical level of approval as the 9,000 AC-triples.

Thus, storing approvals at the account trustee and resource trustee level may result in smaller storage requirements than storing approvals at the AC-triple level. The reduced volume of approvals may also result in fewer role details being originally approved and/or renewed by account trustees and resource trustees.

In some implementations, other servers or security domains may request that IRBAC server 220 verify authorization for an account to perform an operation on a resource. IRBAC server 220 may determine whether the account is permitted to perform the operation on the resource based on the role, the account trustee approvals, and the resource trustee approvals. IRBAC server 220 may provide a response to the other servers or security domains indicating whether the account is permitted to perform the operation on the resource. Additionally, or alternatively, IRBAC server 220 may use the role, the account trustee approvals, and the resource trustee approvals to update access control information stored in a centralized directory server 240 (as will be discussed in more detail with respect to FIG. 6).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
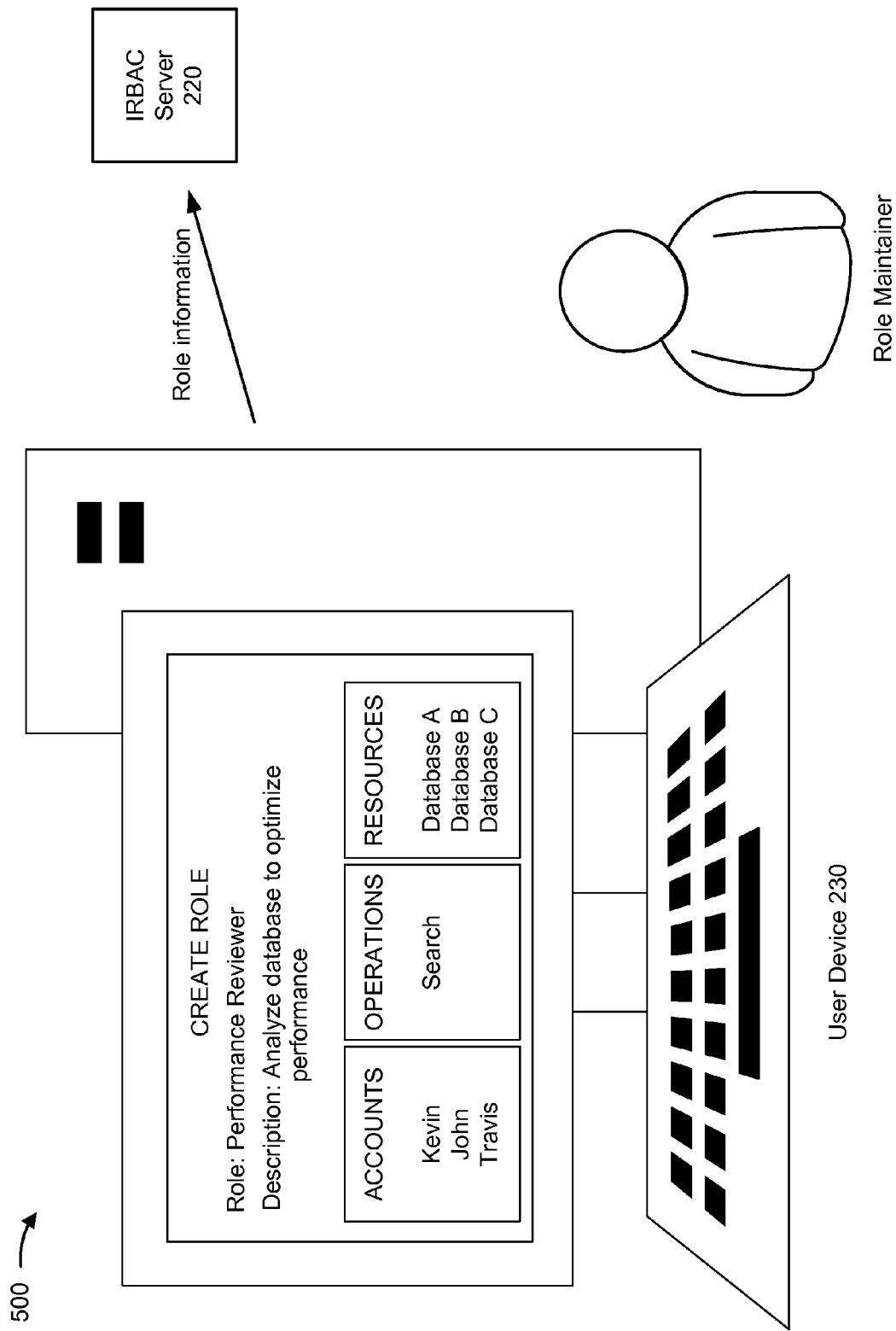
FIGS. 5A-5C are diagrams of an example implementation relating to the example process shown in FIG. 4.
Figure 5B:
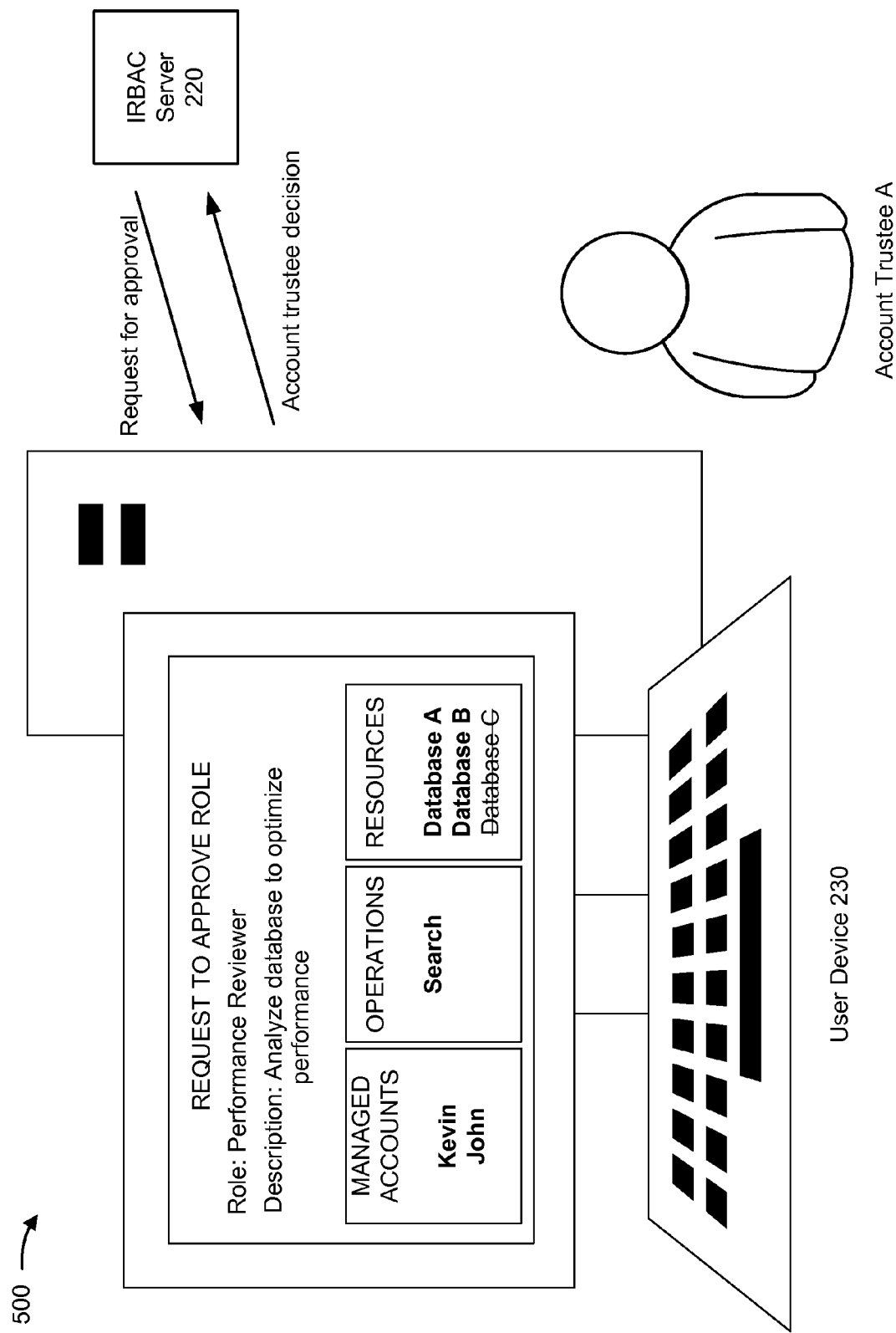
Figure 5C:
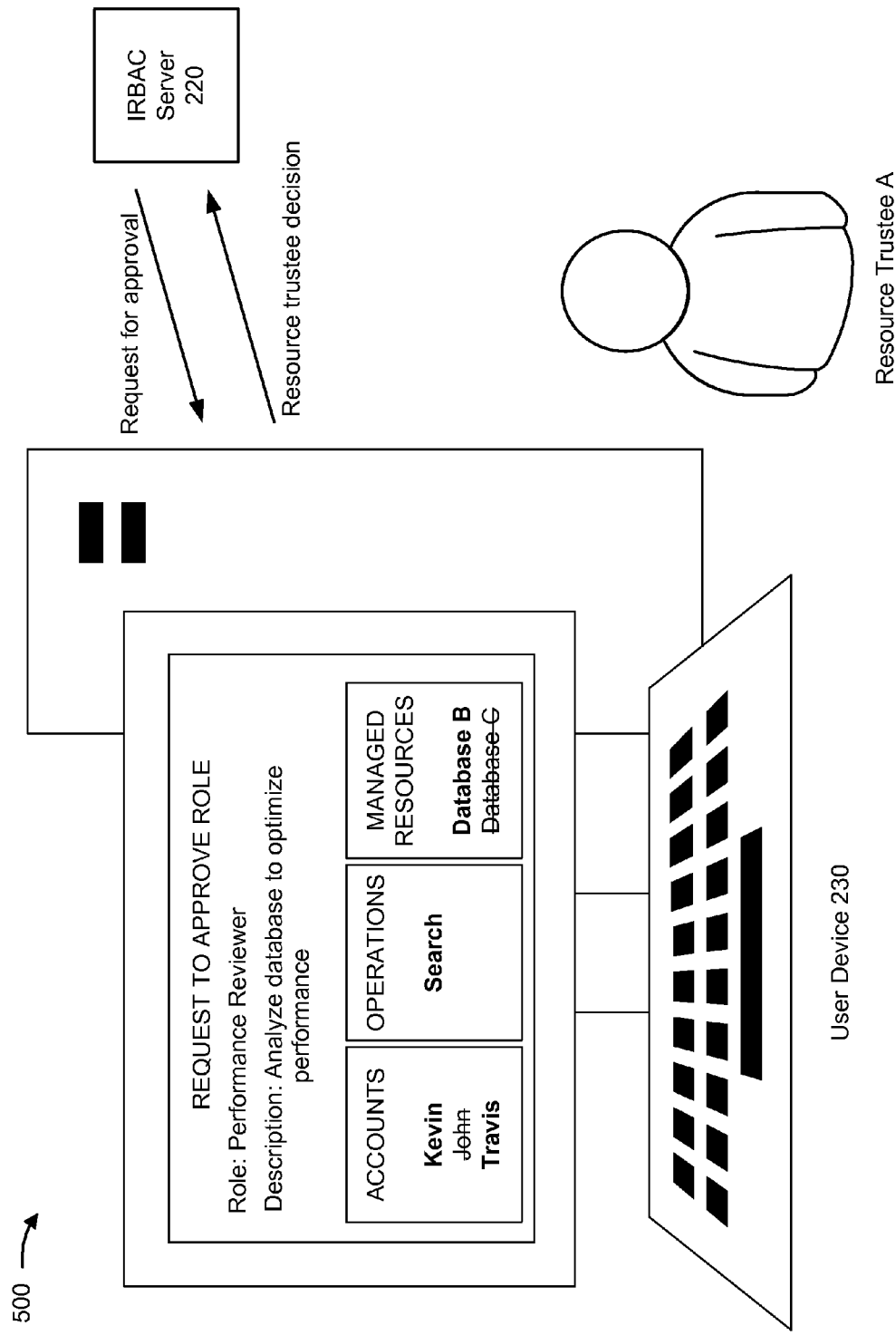

FIGS. 5A-5C are diagrams of an example implementation 500 relating to example process 400 shown in FIG. 4. FIGS. 5A-5C show an example of generating a role and approving accounts, resources, and operations for the role.

In FIG. 5A, assume a role maintainer logs into an IRBAC service operated by IRBAC server 220 and requests a role be created. As shown in FIG. 5A, the role maintainer may specify a name of the role (e.g., "Performance Reviewer") and a description of the role (e.g., "analyze database to optimize performance"). The role maintainer may also specify role details for the role. For example, the role maintainer may specify accounts that should be added to the role (e.g., user accounts for Kevin, John, and Travis). Additionally, the role maintainer may specify operations that should be added to the role (e.g., a search operation). Likewise, the role maintainer may specific resources that should be added to the role (e.g., database A, database B, database C).

In other words, the role maintainer may request that a role be created that allows accounts (e.g., user accounts for Kevin, John, and Travis) to search databases A, B, and C. Such permission may allow the users of the users accounts to analyze the databases and determine how to optimize performance of the databases (as indicated by the role description).

User device 230 may send the role information specified by the role maintainer to IRBAC server 220. Server 220 may receive the role information and store the role information in a role data structure. However, at this point in time, the role has not created any new permissions because account trustee and resource trustee approvals have not been received.

In FIG. 5B, assume an account trustee A manages the user accounts for Kevin and John, but not Travis. Thus, as shown in FIG. 5B, IRBAC server 220 may send account trustee A a request to approve the role. Account trustee A may log into the IRBAC service based on being notified that approval is needed, and IRBAC server 220 may provide relevant role information to account trustee A via user device 230 for approval. For example, the relevant role information may identify the role name, the role description, accounts managed by account trustee A that are associated with the role (e.g., user accounts for Kevin and John), all operations associated with the role, and all resources associated with the role.

Assume user device 230 prompts account trustee A to approve each of the role details (e.g., each account, each operation, and each resource presented for approval). As shown in FIG. 5B, assume account trustee A approves the user accounts for Kevin and John be added to the role, approves the search operation be added to the role (for Kevin and John), and approves database A and database B be added to the role (for Kevin and John). Further, assume account trustee A denies approval for database C. For example, account trustee A may not find it necessary that accounts managed by account trustee A have access to database C for the purpose of analyzing database C to optimize performance.

User device 230 may send the account trustee decisions, regarding the approvals and denials for the role details, to IRBAC server 220. IRBAC server 220 may receive the account trustee decisions and store the account trustee decisions in the role data structure.

IRBAC server 220 may send a similar request for approval to an account trustee B that manages the user account for Travis. Likewise, IRBAC server 220 may receive the account trustee decisions from account trustee B and store the account trustee decisions in the role data structure.

In FIG. 5C, assume a resource trustee A manages database B and database C. Thus, as shown in FIG. 5C, IRBAC server 220 may send resource trustee A a request to approve the role. Resource trustee A may log into the IRBAC service based on being notified that approval is needed, and IRBAC server 220 may provide relevant role information to resource trustee A via user device 230 for approval. For example, the relevant role information may identify the role name, the role description, resources managed by resource trustee A that are associated with the role (e.g., database B and database C), all operations associated with the role, and all accounts associated with the role.

Assume user device 230 prompts resource trustee A to approve each of the role details (e.g., each account, each operation, and each resource presented for approval). As shown in FIG. 5C, assume resource trustee A approves database B be added to the role, approves the user accounts for Kevin and Travis be added to the role, and approves the search operation be added to the role. Further, assume resource trustee A denies approval for database C and the user account for John. Accordingly, no account in the role may be permitted to search database C.

User device 230 may send the resource trustee decisions, regarding the approvals and denials for the role details, to IRBAC server 220. IRBAC server 220 may receive the resource trustee decisions and store the resource trustee decisions in the role data structure.

IRBAC server 220 may send a similar request for approval to a resource trustee B that manages database A. Likewise, IRBAC server 220 may receive the resource trustee decisions from resource trustee B and store the resource trustee decisions in the role data structure.

In some implementations, other servers or security domains may request that IRBAC server 220 verify authorization for an account to perform an operation on a resource. IRBAC server 220 may determine whether the account is permitted to perform the operation on the resource based on the role, the account trustee approvals, and the resource trustee approvals. For example, IRBAC server 220 may determine that Kevin's user account is permitted to search database B because account trustee A and resource trustee A both approved Kevin's user account for that role. On the other hand, IRBAC server 220 may determine that John is not permitted to search database C because account trustee A and resource trustee A did not both approve John for the role. IRBAC may provide a response to the other servers or security domains indicating whether the account is permitted to perform the operation the resource. Additionally, or alternatively, IRBAC server 220 may use the role, the account trustee approvals, and the resource trustee approvals to update access control information stored in a centralized directory server 240.

As indicated above, FIGS. 5A-5C are provided merely as an example. Other examples are possible and may differ from what was described with regard to FIGS. 5A-5C.

Figure 6:
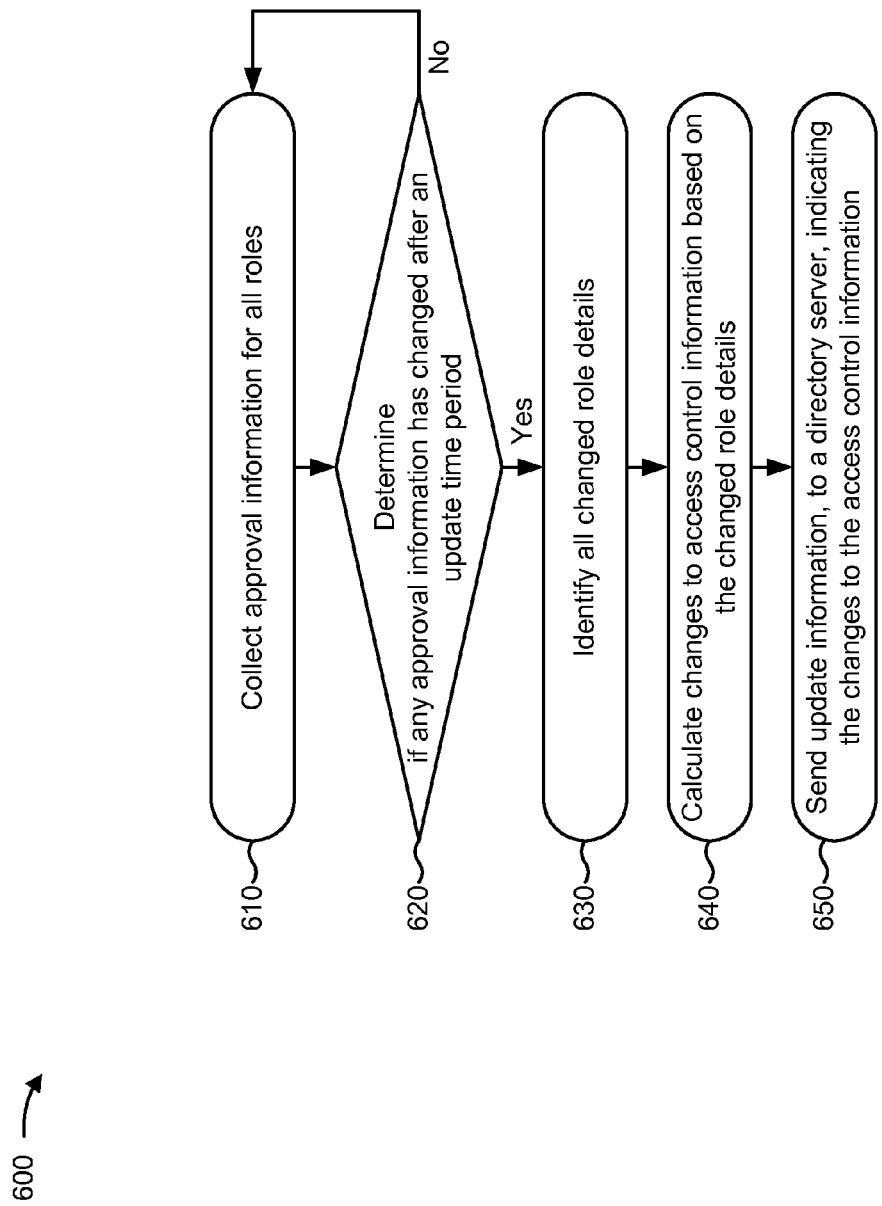
FIG. 6 is a flow chart of an example process for updating access control information stored by a directory server.

FIG. 6 is a flow chart of an example process 600 for updating access control information stored by directory server 240. In some implementations, one or more process blocks of FIG. 6 may be performed by cloud computing environment 210 and/or IRBAC server 220. In some implementations, one or more process blocks of FIG. 4 may be performed by another device or a group of devices separate from or including cloud computing environment 210 and/or IRBAC server 220, such as user device 230 and/or directory server 240.

While some security domains may request IRBAC server 220 to verify authorization for access requests, other security domains may have established access control configurations that request directory server 240 verify authorization for access requests. In such circumstances, IRBAC server 220 may send new or updated access control information to directory server 240 based on the roles.

As shown in FIG. 6, process 600 may include collecting approval information for all roles (block 610). For example, IRBAC server 220 may collect approval information for each role stored in the role data structure.

The approval information may include information related to roles, accounts, operations, resources, account trustees, resource trustees, security domains, valid times, and/or transaction times. IRBAC server 220 may collect the approval information from the role data structure at a particular time and store the approval information in a temporary memory (e.g., a cache). Accordingly, the approval information stored in the temporary memory may represent the approval information at the particular time.

After the approval information has been stored in the temporary memory, IRBAC server 220 may update the approval information in the role data structure to reflect any changes in approval after the particular time (as discussed with respect to block 480 in FIG. 4). For example, new roles may be added to the role data structure based on input from a role maintainer, a resource trustee and/or an account trustee may change an approval or a denial for a role detail, approvals may expire and automatically be canceled, and/or valid times for approvals may lapse.

As further shown in FIG. 6, process 600 may include determining if any approval information has changed after an update time period (block 620). For example, IRBAC server 220 determine if any approval information has changed.

The update time period may represent a time period or frequency of updating access control information stored by directory server 240. After the update time period has lapsed (e.g., a minute, a half hour, an hour, etc.) from the particular time the approval information was stored in the temporary memory, IRBAC server 220 may compare the cached approval information (e.g., representing the approval information at the particular time) with the approval information in the role data structure (e.g., representing the approval information at an access time the role data structure is accessed). In other words, IRBAC server 220 may compare the approval information at a before time (e.g., the particular time) with the approval information at an after time (e.g., the particular time plus the updated time period).

IRBAC server 220 may determine that approval information has changed if the cached approval information is different than the approval information stored in the role data structure. On the other hand, IRBAC server 220 may determine that the approval information has not changed if the cached approval information is the same as the approval information stored in the role data structure.

Additionally, or alternatively, IRBAC server 220 may use a naive approach of determining changes in approval information by generating AC-triples for all of the approval information and comparing the AC-triples for differences. However, as previously discussed, if the approval information was extrapolated and stored at an AC-triple level, the amount of data stored would be greater than the amount of data stored for the approval information stored at the account trustee and resource trustee level. For example, assume a role is associated with 30 accounts, 10 operations, and 30 resources. If approval information was stored at the AC-triple level, then 9,000 AC-triples would have to be stored for the role. However, if there is one distinct account trustee for the 30 accounts and one distinct resource trustee for the 30 resources (e.g., a best case scenario), only 140 approval records would need to be stored to give the same logical level of approval as the 9,000 AC-triples.

Consequently, comparing the approval information (e.g., stored at the account trustee and resource trustee level) is a more efficient use of resources than comparing AC-triples because less data needs to be compared while still accurately detecting any changes in approvals between two points in time. Accordingly, comparing the approval information to detect approval changes may avoid the overhead that comparing AC-triples creates.

As further shown in FIG. 6, if IRBAC server 220 determines approval information has not changed after the update time period (block 620—no), then process 600 may return to block 610 and update the approval information stored in the temporary storage at a new time. In some implementations, IRBAC server 220 may send a notification to directory server 240 that indicates there are no updates to the access control information.

As further shown in FIG. 6, if IRBAC server 220 determines approval information has changed after the update time period (block 620—yes), then process 600 may include identifying all changed role details (block 630).

IRBAC server 220 may correlate account trustee approvals and resource trustee approvals within each role detail to identify a changed role detail (e.g., a change to an existing role detail) or a new role detail (e.g., a role detail that was created during the update time period).

As further shown in FIG. 6, process 600 may include calculating changes to access control information based on the changed role details (block 640). For example, IRBAC server 220 may calculate changes to the access control information. In some implementations, the access control information may include an access control list (ACL) that indicates permitted AC-triples.

A change in an approval of a single role detail may result in changes to multiple AC-triples. For example, if a resource trustee changes a resource approval for a role to a resource denial, then each AC-triple for the role (e.g., each combination of an account, an operation, and the resource in the role) will no longer be a permitted AC-triple (e.g., an AC-triple that allows an account to perform an operation on a resource). IRBAC server 220 may calculate the affected AC-triples and generate update information indicating the changes to the AC-triples. The update information may include instructions to remove AC-triples from the ACL or to add AC-triples to the ACL. For example, a new role may have been created during the updated time period; or an account, an operation, and/or a resource may have been added to an existing role which may result in new permitted AC-triples that should be added to the ACL.

As further shown in FIG. 6, process 600 may include sending the update information, to directory server 240, indicating the changes to the access control information (block 650). For example, IRBAC server 220 may send the update information to directory server 240. IRBAC server 220 may repeat process 600 (e.g., at intervals of the update time period) and periodically send update information to directory server 240.

Directory server 240 may receive the update information and update the access control information stored by directory server 240 using the update information. For example, directory server 240 may add or remove AC-triples from the ACL based on the update information. Accordingly, when accounts attempt to perform an operation on a resource, directory server 240 may permit or deny the operation based on the updated access control information (e.g., the ACL).

In this way, rather than IRBAC server 220 providing all permitted AC-triples to directory server 240 at intervals of the update timer period (e.g., every couple of minutes) and directory server 240 replacing all the existing AC-triples with the new AC-triples, IRBAC server 220 may only provide information related to changes in the access control information. Updating the access control information in this way is more efficient, less computationally expensive, less network taxing, and may reduce outages for users compared to replacing all the AC-triples in the access control information at every update.

In addition to updating access control information in directory server 240, IRBAC server 220 may generate history data structures indicating permissions and/or trustee approvals at past times. Additionally, or alternatively, IRBAC server 220 may be able to calculate permissions at past times based on transaction times and valid times for the roles. Accordingly, IRBAC server 220 may receive a request to identify who was authorized to access a particular resource at a past date (or a present date) and respond with information identifying the accounts permitted to access the particular resource at the past date.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
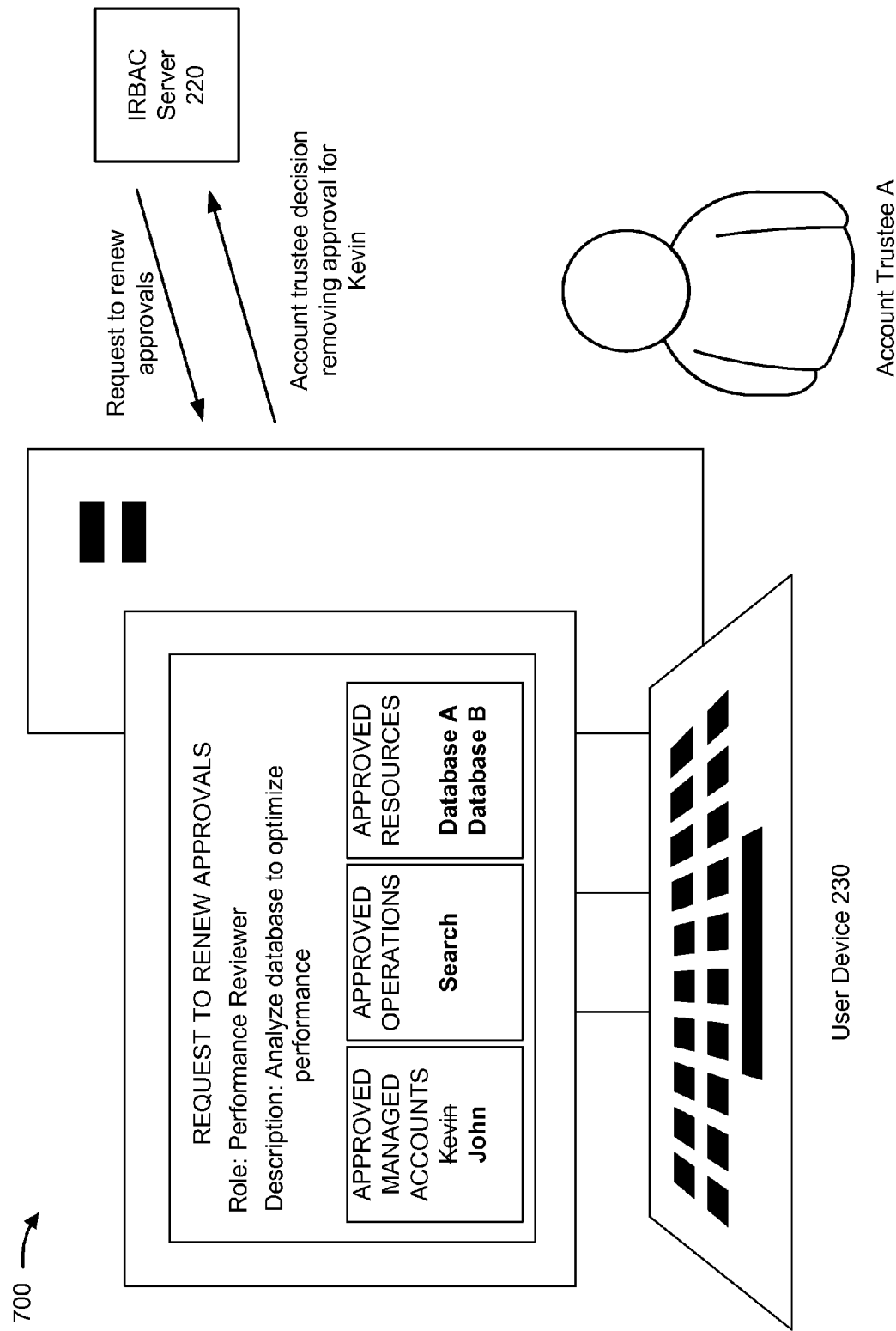
FIGS. 7A and 7B are diagrams of an example implementation relating to the example process shown in FIG. 6.
Figure 7B:
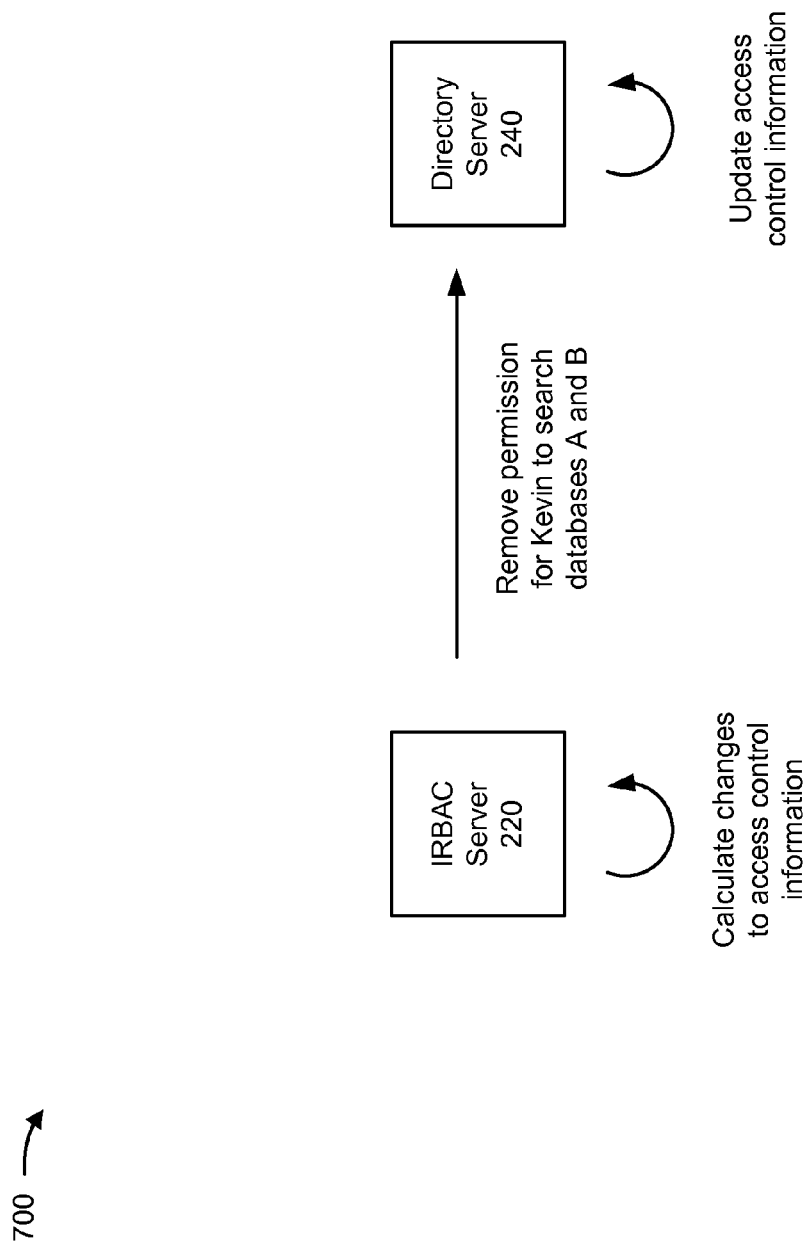

FIGS. 7A and 7B are diagrams of an example implementation 700 relating to example process 600 shown in FIG. 6. FIGS. 7A and 7B show an example of updating access control information stored by directory server 240.

In FIG. 7A, assume an effective period for account trustee A's approvals is nearing an end. Accordingly, IRBAC server 220 may request that account trustee A renew the approvals. Account trustee A may log into the IRBAC service and receive information about approvals that need to be renewed. Account trustee A may not be prompted to renew denials. For example, account trustee A previously denied database C for the role in FIG. 5B, and thus database C does not appear as a resource that needs to be reapproved. Account trustee A may input reapprovals, into user device 230, for John's user account, the search operation, database A, and database B. However, account trustee A may deny reapproval for Kevin's user account. For example, account trustee A (e.g., Kevin's supervisor) may no longer desire Kevin to perform the role of a performance reviewer. User device 230 may send account trustee A's approval decisions to IRBAC server 220 and IRBAC server 220 may receive the decisions. IRBAC server 220 may update the role data structure with the renewed approvals. Assume this update takes place at 2:00.

In FIG. 7B, assume that prior to the role data structure being updated with account trustee A's renewed approvals at 2:00 PM, IRBAC server 220 caches approval information from the role data structure at 1:55. Further assume, IRBAC server 220 sends updates to directory server 240 every ten minutes with the last update occurring at 1:55. Accordingly, at 2:05, IRBAC server 220 may compare the cached approval information with the role data structure to determine if there have been any changes made between 1:55 and 2:05. IRBAC server 220 may determine the cached approval information is not the same as the role data structure and determine that a change has been made. IRBAC server 220 may identify the denial of Kevin's user account as a role detailed that was changed.

As shown in FIG. 7B, IRBAC server 220 may calculate changes to the access control information (e.g., an ACL) based on the denial of Kevin's user account. IRBAC server 220 may send update information to directory server 240 indicating that Kevin's user account no longer has permission to perform a search on databases A and B. Directory server 240 may receive the update information and update stored access control information to reflect Kevin's user account no longer has permission to perform a search on databases A and B.

As indicated above, FIGS. 7A and 7B are provided merely as an example. Other examples are possible and may differ from what was described with regard to FIGS. 7A and 7B.

Implementations described herein provide an IRBAC model that separates role maintenance into a two phase approval process. Accordingly, a role maintainer may create a role without needing special privileges, and role details can be added to the role without unapproved privilege escalation. The role details added to the role may not result in a new privilege until the two phase approval process is complete. Moreover, an ACL may be updated using the IRBAC model without having to generate AC-triples for all possible permissions.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive a role request to generate a role used for access control;
   generate the role based on the role request;
   associate, at a first time, a group of accounts, a group of resources, and a group of operations with the role without creating a privilege until an approval process is completed by an account trustee and a resource trustee;
   receive an account trustee approval decision for the role from the account trustee,
      the account trustee being responsible for managing at least one account included in the group of accounts;
   receive a resource trustee approval decision for the role from the resource trustee,
      the resource trustee being responsible for managing at least one resource included in the group of resources,
      the resource trustee being different than the account trustee; and
   selectively cause, at a second time after the first time, the privilege to be created by permitting an account to perform an operation on a resource based on the account trustee approval decision and the resource trustee approval decision,
      the account being included in the group of accounts,
      the operation being included in the group of operations, and
      the resource being included in the group of resources.

2. The device of claim 1, where the account trustee approval decision includes a resource decision indicating a resource approval or a resource denial for each resource included in the group of resources,
   where the account trustee approval decision includes an operation decision indicating an operation approval or an operation denial for each operation included in the group of operations, and
   where the account trustee approval decision includes an account decision indicating an account approval or an account denial for each account that is both managed by the account trustee and included in the group of accounts, and where the one or more processors, when selectively causing the privilege to be created, are to:

selectively cause, at the second time, the privilege to be created by permitting the account to perform the operation on the resource based on the resource decision, the operation decision, and the account decision included in the account trustee approval decision.

3. The device of claim 2, where the resource decision and the operation decision apply to all accounts that are both managed by the account trustee and included in the group of accounts.

4. The device of claim 1, where the resource trustee approval decision includes an account decision indicating an account approval or an account denial for each account included in the group of accounts, where the resource trustee approval decision includes an operation decision indicating an operation approval or an operation denial for each operation included in the group of operations, and where the resource trustee approval decision includes a resource decision indicating a resource approval or a resource denial for each resource that is both managed by the resource trustee and included in the group of resources, and where the one or more processors, when selectively causing the privilege to be created, are to:

selectively cause, at the second time, the privilege to be created by permitting the account to perform the operation on the resource based on the resource decision, the operation decision, and the account decision included in the resource trustee approval decision.

5. The device of claim 4, where the account decision and the operation decision apply to all resources that are both managed by the resource trustee and included in the group of resources.

6. The device of claim 1, where the group of accounts includes accounts managed by a plurality of account trustees, and where the one or more processors, when receiving the account trustee approval decision for the role, are to:
receive a plurality of account trustee approval decisions from the plurality of account trustees,
the plurality of account trustee approval decisions including the account trustee approval decision, and
the plurality of account trustees including the account trustee.

7. The device of claim 1, where the group of resources includes resources managed by a plurality of resource trustees, and where the one or more processors, when receiving the resource trustee approval decision for the role, are to:
receive a plurality of resource trustee approval decisions from the plurality of resource trustees,
the plurality of resource trustee approval decisions including the resource trustee approval decision, and
the plurality of resource trustees including the resource trustee.

8. A non-transitory computer-readable medium storing instructions, the instructions comprising:
one or more instructions that, when executed by one or more processors, cause the one or more processors to:

receive a role request to generate a role used for access control;
generate the role based on the role request;
associate, at a first time, a group of accounts, a group of resources, and a group of operations with the role without creating a privilege until an approval process is completed by an account trustee and a resource trustee;
receive an account trustee approval decision for the role from the account trustee,
the account trustee being responsible for managing at least one account included in the group of accounts;
receive a resource trustee approval decision for the role from the resource trustee, the resource trustee being responsible for managing at least one resource included in the group of resources,
the resource trustee being different than the account trustee; and
selectively cause, at a second time after the first time, the privilege to be created by permitting an account to perform an operation on a resource based on the account trustee approval decision and the resource trustee approval decision,
the account being included in the group of accounts,
the operation being included in the group of operations, and
the resource being included in the group of resources.

9. The non-transitory computer-readable medium of claim 8, where the one or more instructions, when executed by the one or more processors, further cause the one or more processors to:
determine that the account trustee that is responsible for managing the at least one account based on the at least one account associated with the role;
send a notification to the account trustee indicating role details that need to be approved by the account trustee; and where the one or more instructions, that cause the one or more processors to receive the account trustee approval decision for the role from the account trustee, cause the one or more processors to:
receive the account trustee approval decision based on the notification.

10. The non-transitory computer-readable medium of claim 8, where the account trustee approval decision indicates a time period that the account trustee approval decision is valid, and where the one or more instructions, that cause the one or more processors to selectively cause, at the second time after the first time, the privilege to be created by permitting the account to perform the operation on the resource, cause the one or more processors to:
selectively cause, at the second time after the first time, the privilege to be created by permitting the account to perform the operation on the resource based on the time period.

11. The non-transitory computer-readable medium of claim 8, where the one or more instructions, that cause the one or more processors to selectively cause, at the second time after the first time, the privilege to be created by permitting the account to perform the operation on the resource, cause the one or more processors to:
receive a request to verify the account;
determine whether the account is verified based on the account trustee approval decision; and provide a response indicating whether the account is verified.

12. The non-transitory computer-readable medium of claim 8, where the one or more instructions, that cause the one or more processors to selectively cause, at the second time after the first time, the privilege to be created by permitting the account to perform the operation on the resource, cause the one or more processors to:
cause control access information stored by a directory server to be updated based on at least one of the account trustee approval decision or the resource trustee approval decision.

13. The non-transitory computer-readable medium of claim 8, where the one or more instructions further cause the one or more processors to:
send a renewal request to the account trustee requesting that the account trustee renew the account trustee approval decision; and
cause the account to be prevented from performing the operation on the resource when the account trustee approval decision is not renewed within a particular amount of time since the account trustee approval decision was received.

14. A method, comprising:
receiving, by one or more devices, a role request to generate a role used for access control;
generating, by the one or more devices, the role based on the role request;
associating, by the one or more devices, at a first time, a group of accounts, a group of resources, and a group of operations with the role without creating a privilege until an approval process is completed by an account trustee and a resource trustee;
receiving, by the one or more devices, an account trustee approval decision for the role from the account trustee, the account trustee being responsible for managing at least one account included in the group of accounts;
receiving, by the one or more devices, a resource trustee approval decision for the role from the resource trustee, the resource trustee being responsible for managing at least one resource included in the group of resources, the resource trustee being different than the account trustee; and
selectively causing, by the one or more devices and at a second time after the first time, the privilege to be created or updated by permitting an account to perform an operation on a resource based on the account trustee approval decision and the resource trustee approval decision,
the account being included in the group of accounts,
the operation being included in the group of operations, and
the resource being included in the group of resources.

15. The method of claim 14, where causing the privilege to be created or updated includes:
determining whether any role details for the role have been changed from a past time;
identifying a changed role detail based on determining whether any role details for the role have been changed;
calculating a change to the privilege based on the changed role detail; and
sending update information to a server indicating the change to the privilege.

16. The method of claim 14, further comprising:
receiving a request to associate a particular account with the role;
sending a first request to a particular account trustee that is responsible for managing the particular account;
receiving a particular account trustee approval decision, from the particular account trustee, indicating whether the particular account is approved for the role;
sending a second request to each resource trustee that is responsible for managing resources included in the group of resources associated with the role;
receiving particular resource trustee approval decisions, from each of a plurality of resource trustees, indicating whether the particular account is approved for the role; and
causing permissions for the particular account to be updated based on the particular account trustee approval decision and the particular resource trustee approval decisions.

17. The method of claim 14, further comprising:
receiving a request to associate a particular resource with the role;
sending a first request to a particular resource trustee that is responsible for managing the particular resource;
receiving a particular resource trustee approval decision, from the particular resource trustee, indicating whether the particular resource is approved for the role;
sending a second request to each account trustee that is responsible for managing accounts included in the group of accounts associated with the role;
receiving particular account trustee approval decisions, from each of a plurality of account trustees, indicating whether the particular resource is approved for the role; and
causing permissions for the particular resource to be updated based on the particular resource trustee approval decision and the particular account trustee approval decisions.

18. The method of claim 14, further comprising:
receiving a request to associate a particular operation with the role;
sending a first request to each resource trustee that is responsible for managing resources included in the group of resources associated with the role;
receiving particular resource trustee approval decisions, from each of a plurality of resource trustees, indicating whether the particular operation is approved for the role;
sending a second request to each account trustee that is responsible for managing accounts included in the group of accounts associated with the role;
receiving particular account trustee approval decisions, from each of a plurality of account trustees, indicating whether the particular operation is approved for the role; and
causing permissions for the particular operation to be updated based on the particular account trustee approval decisions and the particular resource trustee approval decisions.

19. The method of claim 14, where associating the group of accounts, the group of resources, and the group of operations with the role includes associating the group of accounts, the group of resources, and the group of operations with the role based on instructions from a user.

20. The method of claim 19, where permissions for the group of accounts, the group of resources, and the group of operations are not updated or generated until the account trustee approval decision and the resource trustee approval decision are both received.

* * * * *